Dec. 26, 1922. 1,439,817.
C. HERRMANN.
ANNUNCIATOR DROP.
FILED OCT 24, 1919

Inventor
Charles Herrmann
By his Attorneys
Meyers, Cushman & Rea

Patented Dec. 26, 1922.

1,439,817

UNITED STATES PATENT OFFICE.

CHARLES HERRMANN, OF NEW YORK, N. Y., ASSIGNOR TO CHARLES CORY & SON, INCORPORATED, OF NEW YORK, N. Y., A CORPORATION OF NEW YORK.

ANNUNCIATOR DROP.

Application filed October 24, 1919. Serial No. 333,025.

*To all whom it may concern:*

Be it known that I, CHARLES HERRMANN a citizen of the United States, and resident of New York city, in the county of Kings and State of New York, have invented certain new and useful Improvements in Annunciator Drops, of which the following is a specification.

My invention relates to annunciator drop mechanism, and particularly to an electrically actuated drop positively shifted both into and out of operative position.

My invention is particularly adapted for use in annunciators of the type having a sight opening or window, with an indicator plate which is dropped into view behind the window to transmit a signal and is retracted from the window after the signal is received. Annunciators of this type are ordinarily provided with electrical means for shifting the indicator plate downwardly into position in front of the window. It is the usual practice, however, to return the indicator plate to inactive position by mechanical means. This is subject to serious objections, as such means can be operated only from a point immediately adjacent the annunciator, preventing the location thereof in out-of-way places where the use of mechanical indicator returning means is impractical or undesirable. It particularly prevents the operation of the return mechanism from a distance.

Annunciators of this type also include normally a plurality of drops; and it is highly desirable that these drops and their operating mechanism be very compact, to confine the annunciator casing to a minimum size, desirable under ordinary conditions, and absolutely necessary in certain locations, such as on shipboard, where space is limited and a bulky annunciator would be impractical. The maximum of compactness in a lateral direction is obtained when the entire operating mechanism is entirely located directly behind the indicator plate, as such a construction permits the plates to be arranged with practically no space between them. It is, furthermore, necessary that the mechanism be simple, positive and strong in action, as it is often vital to have the annunciator operate infallibly for transmitting important signals.

With this and other objects in view, I have devised an annunciator drop and mechanism for actuating the same which meets all the requirements above outlined, and is simple, composed of a minimum number of parts, and very easily and readily manufactured.

I have provided electrical means for positively shifting the indicator plate into operative position at the will of the operator, and for similarly retracting the plate positively when desired.

I have also produced a construction especially adapted for use on shipboard and in other places where the annunciator is subjected to vibration and to variations of angle with the horizontal, which would cause the indicator plates of the ordinary annunciator to drop into operative position without proper actuation thereof, thus rendering the annunciator useless for signal purposes.

I have likewise provided particular means for preventing the actuation of the annunciator drop by shocks or blows, either in connection with ordinary usage in exposed places or caused by the firing of guns or the impact of projectiles.

Further objects and advantages of my construction will be apparent from the following description, taken in connection with the accompanying drawings, in which—

Figure 1:
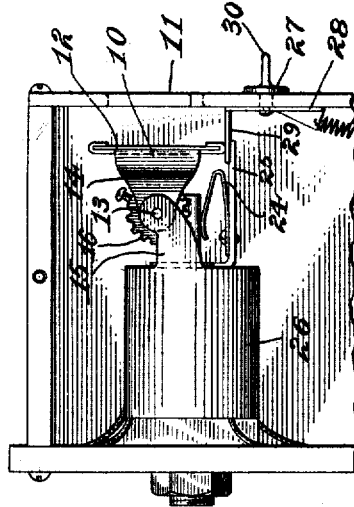
Fig. 1 is an end view of my invention in operative position, showing a portion of an annunciator casing.
Figure 2:
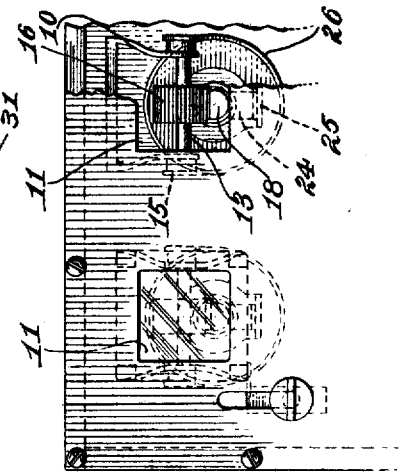
Fig. 2 is a fragmentary front view of an annunciator casing, showing two units in operative and inoperative position respectively.
Figure 3:
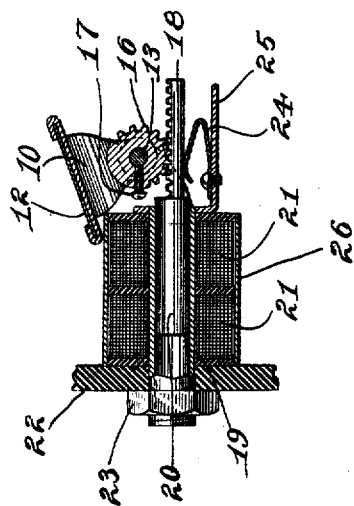
Fig. 3 is a longitudinal sectional view showing the indicator plate in inoperative position.
Figure 4:
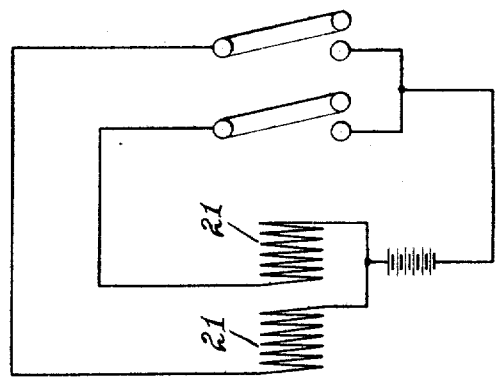
Fig. 4 is a wiring diagram.

My invention includes an indicator plate or dial 10 adapted to be located either immediately behind a sight opening or window 11, as shown in Fig. 1, or to be retracted out of view therefrom in the position shown in Fig. 3. Plate 10 is preferably adapted to hold a removable card 12 carrying a suitable signal; but this construction is purely optional, any desired type of indicating element being comprehended.

I provide mechanical means for engaging plate 10 to shift it between the position shown in Figs. 1 and 3. Various forms of mechanism for this purpose may be employed. In the form disclosed, I mount plate 10 on rock shaft 13, as by providing ears 14 on the plate engaging said shaft. Shaft 13 may be mounted in any desired way, as in bearings carried by lugs 15, mounted on a fixed part of the mechanism. The pinion 16 is rigidly mounted on shaft 13 as by set screw 17 and engages a reciprocating rack 18.

I have provided electrical means for reciprocating rack 18. Any desired form of magnetic element may be used for this purpose, preferably including an armature and magnet means actuated at will to shift the armature between two positions, the armature being operatively connected with the mechanical means for shifting indicator plate 10. In the preferred form, I have disclosed a solenoid mounted on a hollow core 19, preferably constructed of brass. Within core 19 an armature 20 is slidably mounted, rack 18 being connected to the armature 20, as by forming the rack as a continuation of the armature. The solenoid may be in the form of a continuous coil, but this construction has been found to be irregular in operation, as it depends for efficiency upon the reversal of the current through the solenoid, and the maintenance of fixed polarity in the armature. The latter is impractical as the solenoid when energized tends to change the polarity of the armature and renders the effect of the solenoid on the armature uncertain. Consequently, I prefer to provide a pair of adjacent solenoid windings 21, each of which is separately connected to an actuating switch, such as a push button, rendering the action of each solenoid on the armature 20 definite and certain, regardless of the polarization thereof by the solenoid currents. The solenoid may be mounted in any desired way upon a base 22, as by passing core 19 through the base and threading a nut 23 on the end of the core; but this arrangement is purely illustrative.

I have provided means for preventing the shifting of indicator plate 10 from either inactive or active position without energizing a solenoid winding 21. Various means for this purpose may be provided, including frictional catch elements adapted to hold the indicator plate in each position. In the preferred form, I have disclosed means for frictionally engaging the rack 18, the engagement being sufficient to prevent dislocation of the indicator plate through accidental causes, but insufficient to prevent the normal operation of the shifting mechanism. In the preferred form of frictional engagement with the rack, spring member 24 may be used, bearing against the rack and mounted on arm 25, which is carried by the solenoid, arm 25 also serving to form a stop for indicator plate 10 when the latter is shifted to active position. For convenience, lugs 15 may be formed integral with the base of arm 25, or may be carried by a shield cylinder 26 mounted about the solenoid windings to protect and preserve them. If desired, auxiliary manually operated means may be provided for returning the annunciator drop to inactive position without the energizing of a solenoid 20, one form of device including a vertical slide 27 mounted to reciprocate in a slot 28 in the casing, provided with an inwardly extending lip 29 adapted to engage the lower edge of indicator plate 10, and an outwardly extending finger piece 30. Slide 27 is normally held in inactive position, either by gravity or by spring means, one end of a suitable spring 31 being indicated in Fig. 1.

It will be apparent that considerable variation in the angle of mounting of my annunciator drop element is possible without affecting the operation thereof, as spring 24 is normally sufficiently strong to overcome any tendency of gravity or ordinary vibration to move indicator plate 10 when the solenoid windings are not energized.

The unit is also entirely self-contained; and where a large number are used, any individual unit may readily be removed and replaced without disturbing the others or interfering with the general wiring. It will be noted that by properly proportioning the parts, an endwise shock on the unit when in inactive position, shown in Fig. 3, may be rendered entirely ineffective to shift the indicator plate into operative position, as the tendency of the plate to move forward will be balanced by a similar opposing tendency on the part of the armature and rack. This effect will obtain regardless of the violence of the shock, though the latter, if sufficiently strong, would result in the shifting of indicator plate 10 into operative position with any of the types of reciprocating annunciator heretofore known.

While I have described the preferred form of my invention and certain modifications therein, my invention includes many other variations and changes in the construction shown, falling within the scope of my invention as disclosed in this specification.

I claim:

1. In an annunciator drop, a base, a shield cylinder, a hollow core passing through the cylinder and adapted to hold the cylinder in relation to the base, a solenoid winding on each end of the core, an armature within the core, said armature extending beyond the core, a rack on the extended end of the armature, a bracket on said cylinder, a shaft mounted on said bracket, a pinion on the shaft and meshing with the rack on the armature, and an oscillating indicator member mounted on said shaft.

2. In an annunciator drop, a solenoid winding, a hollow core for said winding, an armature movably mounted in said core, an oscillating indicator member operatively associated with said armature, a stop member for limiting the oscillations of the indicator member, a spring member mounted upon the stop member and bearing against the armature to hold the armature against movement when the winding is not energized.

3. In an annunciator drop, an indicator member mounted to rotate about a fixed axis, a pinion connected to the indicator member, a reciprocating rack engaging said pinion, a solenoid, an armature located in said solenoid and connected to the rack, the construction being such that the suitable energizing of the solenoid will shift the armature in either direction at will, rotating the indicator member in the desired direction about its axis, a stop member for limiting the rotation of the indicator member and a friction means upon the stop member for retaining the armature in different positions.

4. In a compact and substantially unitary annunciator drop mechanism, suitable for indicator boards and similar purposes, a solenoid including a plurality of separate windings, a common hollow core for said windings, an armature slidably mounted in said core, a bracket, a shaft mounted therein and located transversely in front of and adjacent to one end of the solenoid at one side of the armature axis, a pinion mounted on said shaft, a rack mounted on the armature and engaging said pinion, and an indicator member mounted on said shaft, and arranged to swing into active position in front of the solenoid.

5. In an annunciator drop, an electromagnet, a bracket mounted on said magnet, a shaft journaled in the bracket, an indicator member mounted on the shaft, stop means carried by the magnet for limiting the oscillation of the indicator member, an armature carried by said electromagnet, means on the stop means for retaining the armature in different positions, and mechanical means connecting said armature and indicator member.

Signed at New York city in the county of N. Y. and State of N. Y. this 22nd day of October A. D. 1919.

CHARLES HERRMANN.